UNITED STATES PATENT OFFICE.

GUSTAV LANDMANN, OF FRANKFORT-ON-THE-MAIN, GERMANY, ASSIGNOR TO LOUIS MERCK, E. A. MERCK, WILLY MERCK, AND C. E. MERCK, OF DARMSTADT, GERMANY.

PROCESS OF OBTAINING TUBERCULOSIS TOXIN.

SPECIFICATION forming part of Letters Patent No. 649,938, dated May 22, 1900.

Application filed June 2, 1899. Serial No. 719,053. (No specimens.)

*To all whom it may concern:*

Be it known that I, GUSTAV LANDMANN, a citizen of Germany, residing at Frankfort-on-the-Main, Empire of Germany, have invented certain new and useful Improvements in Processes of Obtaining Tuberculosis Toxins, of which the following is a full, clear, and exact description.

Various methods for obtaining tuberculosis toxins have been made known, none of them, however, embracing the characteristic points of the process here to be described. In all the usual methods for this purpose a very considerable proportion of the toxins present in the tuberculosis bacilli cultures from which the extraction is made remains unextracted, this proportion amounting to one-half and more, as has been shown by subjecting the bacilli thus previously subjected to exhaustion by the known methods to renewed exhaustion by the method here to be described, when considerable amounts of toxins were yet obtained which had not been extracted by the previously-employed methods.

It had before been demonstrated by me through animal experimentation that tuberculosis toxins extracted by known methods at certain temperatures became impaired in efficacy by being thereafter subjected for a short time to somewhat-increased temperatures, while still at such increased temperatures additional toxins of notable efficacy could be obtained from the tuberculosis bacilli already subjected to as complete exhaustion as possible at the previously-employed lower temperatures. This proves that different forms of tuberculosis toxins exist in the bacilli and that some of these are extractable only at higher temperatures than others, while those extractable at lower temperatures would suffer in their efficacy by being extracted along with those extractable only at the higher temperatures in one and the same operation. For instance, I have found by experimentation that after completely exhausting tuberculosis bacilli at 40° centigrade and setting aside the extract I could obtain another portion of the extract by exhausting at 60° centigrade the residue from the first extraction. The same kind of experience was found to be repeated at 80° centigrade, again at 90° centigrade, and again at near 100° centigrade. Each of the five portions of extract thus obtained was found, on animal experimentation, to possess a certain determinable degree of toxicity of its own. Each of the first four portions, furthermore, when heated by itself to the degree at which the next higher portion thereafter had been extracted was found, on renewed animal experimentation, to have lost a considerable percentage of its first-established toxic power. This observation led to the method here presented for successively extracting from tuberculosis bacilli the various forms of toxins therein contained without impairing the toxic efficacy of any of them by subjecting them to temperatures higher than are necessary for their exhaustion.

The new method then, as preferably carried out, consists in extracting by known means at a comparatively-low temperature—say 35° centigrade—all the toxin matter thus obtainable from the tuberculosis bacilli, then removing the liquid extract thus obtained, then resuming exhaustion on the residue at a somewhat-increased temperature, then removing the liquid extract again, and thus continuing by successive exhaustions with corresponding increases of temperature, alternating with removal of the portion of extract gained at each temperature until about the boiling temperature of water has been reached. This method I call "fractional exhaustion." By it all toxins present in the tuberculosis bacilli are removable, (as is shown by the residue being physiologically inert.)

Of course my process could be carried out and nearly all of the advantages obtained without extracting absolutely all of the toxins; but the best results are obviously obtained by extracting all of such toxins.

In an actual example of manufacture I proceeded as follows: The bacilli of a tuberculosis culture having been removed from the culture medium were freed from fat by the usual means, then freed from mucin by treatment with dilute soda-lye, then finely comminuted, then covered with distilled water or some other suitable exhausting medium, and subjected for hours to exhaustion at the temperature of 35° Celsius. Then the liquid was decanted and set aside. The residue having been covered with a fresh portion of the exhausting menstruum was now similarly treated again for hours at 40° centigrade. Then the liquid was again decanted. Thus rising by 5° centigrade at each operation the same manipulations were repeated again and again until the temperature employed had reached nearly 100° centigrade. After cooling all the liquid extract portions thus obtained were united in one container and then concentrated by evaporation *in vacuo* or by other suitable means.

When I speak of a "series" of successively-increased temperatures, I do not mean that the difference between the successive temperatures must necessarily be equal, because it is obvious that this can be varied, and when I speak of "removing the extract" I do not mean that the entire extract obtained must necessarily be removed; but this, of course, is preferable.

It will be obvious that many changes may be made in the process herein disclosed without departing from the spirit of my invention.

What I claim as my invention in the herein-described procedure is—

1. A process of obtaining tuberculosis toxins from tuberculosis bacilli by fractional exhaustion of tuberculosis bacilli by a liquid menstruum at a series of several successively-increased temperatures below 100° centigrade; the result of each partial exhaustion at any of these temperatures being removed from the residue before the latter is subjected to renewed exhaustion at the next higher stage of temperature.

2. The process of obtaining tuberculosis toxins from tuberculosis bacilli which consists in extracting at a comparatively-low temperature (for instance 35° centigrade) toxin matter thus obtainable from the tuberculosis bacilli, then removing the liquid extract thus obtained, then resuming exhaustion on the residue at a somewhat-increased temperature, then removing the liquid extract again, and continuing by successive exhaustions with increase of temperature, all such temperatures being below 100° centigrade alternating with a removal of a portion of extract gained at each step, until substantially the boiling temperature of water has been reached.

3. The process of obtaining tuberculosis toxins from tuberculosis bacilli which consists in freeing the tuberculosis bacilli from fat, treating the same with dilute soda-lye, comminuting the same, covering the same with water, subjecting the same to exhaustion, decanting the liquid, covering the same with a fresh portion of the exhausting menstruum, subjecting the same to exhaustion at an increased temperature below 100° centigrade, and continuing such steps with increase of temperature up to substantially 100° centigrade.

4. The process of obtaining tuberculosis toxins from tuberculosis bacilli which consists in extracting, at successively-increased temperatures below 100° centigrade, soluble toxin matter from such bacilli, removing the extract at each of such temperatures and combining the toxins so obtained.

5. The process of obtaining tuberculosis toxins from tuberculosis bacilli which consists in extracting, at successively-increased temperatures below 100° centigrade, soluble toxin matter from such bacilli, removing the liquid extract at each of such temperatures and combining and concentrating the toxins so obtained.

6. The process of obtaining tuberculosis toxins from tuberculosis bacilli which consists in extracting by a liquid menstruum at a temperature of about blood heat soluble toxin matter from the tuberculosis bacilli, removing the liquid extract thus obtained, resuming the exhaustion of the residue at a somewhat-increased temperature, removing the liquid extract obtained at this increased temperature, continuing by successive exhaustions with an increase of temperature below 100° centigrade alternating with a removal of the extract gained at each of such steps, and combining said toxin products.

7. The process of obtaining tuberculosis toxins from tuberculosis bacilli which consists in extracting by a liquid menstruum at a temperature of about blood heat soluble toxin matter from the tuberculosis bacilli, removing the liquid extract thus obtained, resuming the exhaustion of the residue at a somewhat-increased temperature, removing the liquid extract obtained at this increased temperature, continuing by successive exhaustions with an increase of temperature below 100° centigrade alternating with a removal of the extract gained at each of such steps, combining the toxin products so obtained at such temperatures, and concentrating the same.

Signed at Frankfort-on-the-Main, Germany, this 22d day of May, 1899.

GUSTAV LANDMANN.

Witnesses:
RICHARD GUENTHER,
CARL GRUND.